US007241970B2

(12) United States Patent
Fortain et al.

(10) Patent No.: US 7,241,970 B2
(45) Date of Patent: Jul. 10, 2007

(54) TERNARY GAS MIXTURE WHICH CAN BE USED IN THE BRAZE WELDING OF GALVANIZED PARTS

(75) Inventors: Jean-Marie Fortain, Osny (FR); Jean-Yves Mouton, Cergy Pontoise (FR); Thomas Opderbecke, Saint Ouen l'Aumone (FR)

(73) Assignee: L'Air Liquide, Société Anonyme à Directoire et Conseil de Surveillance pour l'Étude et l'Exploitation des Procedes Georges Claude, Paris (FR)

( * ) Notice: Subject to any disclaimer, the term of this patent is extended or adjusted under 35 U.S.C. 154(b) by 114 days.

(21) Appl. No.: 10/503,357

(22) PCT Filed: Jan. 17, 2003

(86) PCT No.: PCT/FR03/00155

§ 371 (c)(1),
(2), (4) Date: Jul. 30, 2004

(87) PCT Pub. No.: WO03/064098

PCT Pub. Date: Aug. 7, 2003

(65) Prior Publication Data

US 2005/0082349 A1  Apr. 21, 2005

(30) Foreign Application Priority Data

Feb. 1, 2002  (FR)  ............................. 02 01216

(51) Int. Cl.
*B23K 9/16*  (2006.01)
(52) U.S. Cl. ................. 219/129; 219/74; 219/137 WM
(58) Field of Classification Search ................. 219/129, 219/74, 137 WM; 252/373
See application file for complete search history.

(56) References Cited

U.S. PATENT DOCUMENTS

| 6,069,336 A | 5/2000 | Borne et al. .................. 219/75 |
| 6,198,068 B1 * | 3/2001 | Lindstrom ............. 219/121.46 |
| 6,564,990 B2 * | 5/2003 | Nagashima et al. ........ 228/219 |
| 6,570,127 B2 * | 5/2003 | Correia et al. ............. 219/129 |
| 6,596,971 B1 * | 7/2003 | Biskup et al. ...... 219/137 WM |
| 6,969,818 B2 * | 11/2005 | Miklos ........................ 219/74 |

FOREIGN PATENT DOCUMENTS

| DE | 19 10 405 | 11/1970 |
| EP | 0 680 802 A1 | 11/1995 |
| EP | 0 945 207 A1 | 9/1999 |
| WO | WO 03 064096 A2 | 8/2003 |

OTHER PUBLICATIONS

"The welding of galvanized steel and zinc-rich-painted steel", Philips Welding Reporter, 1966, pp. 1-10.
Patent Abstracts of Japan; publication No. 2000197971; publication date Aug. 18, 2000; application date Dec. 25, 1998, Appl. No. 10371661.
International Search Report for PCT/FR02/01216.

* cited by examiner

*Primary Examiner*—Kevin P. Kerns
(74) *Attorney, Agent, or Firm*—Christopher J. Cronin

(57) ABSTRACT

A method of brazing galvanized metal parts such as those used for motor vehicle elements or container components. The parts are joined together to create a brazed joint by using at least one electric arc, a metal filler wire, and a gas shield. The gas shield contains hydrogen, carbon dioxide, and argon.

16 Claims, 2 Drawing Sheets

TERNARY GAS MIXTURE WHICH CAN BE USED IN THE BRAZE WELDING OF GALVANIZED PARTS

Figure 1:
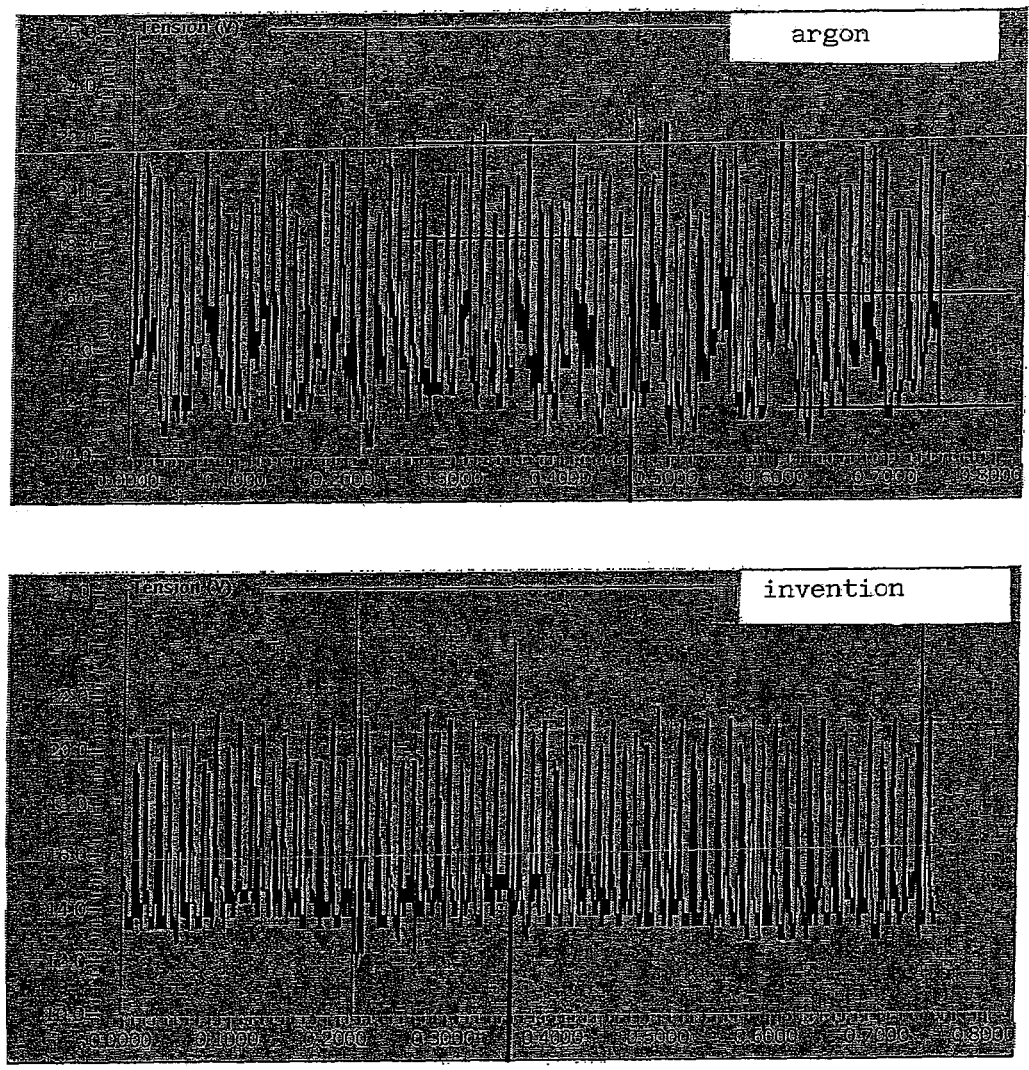

The present invention relates to a ternary gas mixture that can be used in the braze-welding of galvanized parts.

Currently, the problems encountered when welding thin galvanized sheet are essentially due to the characteristics of the sheet.

This is because the thickness of the coated sheet used, especially in the automobile industry, is usually between 0.5 mm and 1.5 mm.

Thicknesses as small as this require the welding process used to weld such sheet to be adapted so as to reduce the energy supplied and consequently to avoid defects such as excessive penetration of the weld with the risk of perforating the sheet, thermal deformation of the sheet, degradation of the zinc coating alongside and on the underside, or metallurgical and chemical degradation of the sheet.

Moreover, zinc, which is the main constituent of the coating on thin galvanized sheet, is characterized by a melting point of 420° C. (boiling point of zinc: 906° C.), which is lower than that of the base metal and the filler metal.

During welding, it is therefore vaporized by the action of the electric arc or by simple thermal conduction, and this zinc vapor can then cause perturbations.

Thus, vaporized zinc may enter the atmosphere of the electric arc and suddenly modify the physical properties of the shielding atmosphere, especially the electrical and thermal conductivity, and consequently can cause instabilities in the mode of metal transfer.

In addition, this vaporization of zinc in the molten metal may cause molten metal spatter on either side of the weld bead.

Furthermore, pores or blisters, which may form when zinc vaporizes beneath the bead root when a lap weld is being made, often result in a gas overpressure beneath the weld pool. This is the case the smaller the gap between the sheets to be joined together and the greater the zinc thickness.

If the weld pool is cooled too quickly, the vapor does not have enough time to rise to the surface and, depending on its density, may affect the mechanical properties of the joint.

The pores that open on the surface of the bead pose other problems, in particular when painting a part thus welded, for example when this part constitutes a visible portion of the body of a motor vehicle.

To try to solve these problems, the technique of braze-welding using a flame, MIG/MAG, TIG, plasma or laser process constitutes a good alternative that has been used for many years in the automobile industry.

Braze-welding makes use of copper-based filler metals having a lower melting point, typically between 890° C. and 1080° C., than that of the ferrous base metal of which the parts to be welded are composed, but above that of the zinc coating, i.e. about 420° C.

In braze-welding, the parts to be welded together are joined not by melting of the base metal and of the metal, but by "wetting" of the solid base metal by liquid copper-based metal provided in the form of a filler wire.

Braze-welding requires a substantially lower injection of energy since this energy serves only to melt the filler wire and not to heat and melt the part. Consequently, the amount of zinc vaporized is greatly reduced compared with conventional welding.

The reader may refer to the document "*The welding of galvanized steel and zinc-rich-painted steel*", Philips Welding Reporter, 1966, pages 1-10 for further details about the braze-welding process.

Several types of alloy may be applied in braze-welding. CuAl ($CuAl_8$)-type alloys are used mainly for obtaining a nice-looking bead and good mechanical properties, whereas $CuSi_3$-type alloys are used mainly for their more attractive costs and the ease of grinding off any projections.

In MIG braze-welding, metal transfer can take place in short-arc or pulsed mode.

Short-arc transfer is used for applications requiring a minimal injection of energy and for "attractive" beads with no projections and with limited deformation. Such transfer is limited to a certain wire speed, to which a given welding speed range will correspond.

Pulsed transfer is used for applications with a higher wire speed and welding speed than in short-arc welding. It leads to a hotter weld pool, which affords advantages in terms of joint clearance tolerance and wetting. The pulsed current complies with the rule of one drop per pulse, which drop must become detached during a background current ($I_{background}$) that is as low and as stable as possible.

Moreover, as is known, the shielding gas used in a MIG/MAG process plays an important role in the process as it has an appreciable influence on the electrical and thermal properties of the electric arc atmosphere on the one hand, and on the shielding of the weld pool.

As explained above, braze-welding is used with the objective of reducing the injection of energy. Gases that are rather inert and substantially inactive will therefore be used.

The gas generally recommended for braze-welding is pure argon.

However, other gases or gas mixtures have already been described as being able to be used in brazed welding.

Thus, binary mixtures of argon with small amounts of oxygen or carbon dioxide are known, for example from the following documents: *MIG Löten verzinkter Dünnbleche und Profile, Schweißen und Schneiden*, [MIG welding of galvanized sheet and strip: Welding and cutting] by H. Hackl, 6.1998, Düsseldorf 1998; *MIG Lötverbindungen, Besonderheiten und Eigenschaften*, [MIG welded joints, special properties and characteristics], by H. Herold, DVS Report 204, Düsseldorf 1999; and a paper on *MSG Impulslichtbogenschweissen von unbeschichteten und beschichteten Feinbleche*, [MSG pulsed-arc welding of coated and uncoated thin sheet] by G. Groten, DVS Volume 35, ISF Dissertation Aachen 1991, Dusseldorf 1991.

However, other documents conclude that the presence of hydrogen is ineffective. In this regard, mention may be made of the document by A. Kersche and S. Trube entitled *Schutzgase zum Löten, Neue Technologien für den Dünnblechbereich*, [Shielding gases in welding: new technologies for the thin sheet field], SLV Munich 2000, which teaches that the presence of small amounts of hydrogen causes porosity and poor wetting.

Furthermore, the document by Hauck and G. Hiller entitled *Lichtbogenschweissen verzinkter Stahlbleche*, [Pulsed-arc welding of galvanized steel sheet], DVS Report 105, Düsseldorf 1986 is also known, which describes a mixture of argon with 30 vol % of helium in the case of $CuAl_8$ wire and with 5 vol % oxygen in the case of $CuSi_3$ wire.

The present invention therefore aims to improve the MIG braze-welding process by proposing a gas mixture that makes it possible, when it is used for the braze-welding of coated sheet, to obtain:

a reduction in the amount of energy injected, in order to reduce the volume of volatilized zinc and deformations;

stabilization of the arc in order to prevent spatter; and good wetting and good bead compactness in all welding positions, with no porosity.

The solution of the invention relates to a ternary gas mixture consisting of hydrogen, carbon dioxide and argon in the following proportions by volume:

0.4 to 2% hydrogen;

0.3 to 2% carbon dioxide; and argon for the remainder (up to 100%).

Depending on the case, the gas mixture of the invention may comprise one or more of the following technical features:

it contains at most 1.95% hydrogen, preferably at most 1.5% hydrogen and even more preferably at most 1.3% hydrogen;

it contains at least 0.5% hydrogen, preferably at least 0.7% hydrogen;

it contains at most 1% carbon dioxide, preferably at most 0.8% carbon dioxide;

it contains at least 0.35% carbon dioxide, preferably at least 0.4% carbon dioxide;

it contains: 0.8 to 1.1% hydrogen; 0.4 to 0.7% carbon dioxide; and argon for the remainder (up to 100%).

it contains approximately: 1% hydrogen; 0.5% carbon dioxide; and argon for the remainder (up to 100%); and the gas shield consists of a ternary mixture formed exclusively from argon, hydrogen and carbon dioxide. However, inevitable impurities may be found in the mixture in small proportions, for example up to 20 ppm by volume of oxygen, up to 20 ppm of nitrogen, up to 50 ppm of $C_nH_m$ and up to 30 ppm of water vapor.

The invention also relates to a process for the braze-welding of galvanized metal parts, in which a brazed joint is produced between the parts to be joined together by fusion, by means of at least one electric arc, a metal filler wire and the use of a gas shield for the braze, characterized in that the gas shield is formed from a gas mixture as given above. Depending on the case, the braze-welding process of the invention may include one or more of the following technical features:

the parts to be joined together have a thickness of less than 3 mm, preferably between 0.5 and 2 mm and even more preferably between 0.6 and 1.5 mm;

the filler metal is made of a copper aluminum alloy (CuAl alloy) or a copper silicon alloy (CuSi alloy);

the metal parts are made of nonalloy carbon steel, preferably an HYS (High Yield Strength) or VHYS (Very High Yield Strength) steel;

the intensity of the current used to generate the arc or arcs is less than 200 A for a wire of 1 mm in diameter;

the current is of variable or nonvariable polarity;

the transfer mode is of the pulsed or short-arc type;

the parts are galvanized by zinc electroplating or hot-dip galvanized; and it uses one or two filler wires.

The invention also relates to a process for manufacturing motor vehicle elements formed from several parts joined together by a braze-welding process according to the invention, in particular of motor vehicle elements chosen from the group formed by the body of the vehicle or the floor/hinge-knuckle joints, the engine cradle, the dashboard cross-members, the longitudinal members, the cross-members under the seats and the hydroformed components.

According to another aspect, the invention also relates to a process for manufacturing a container formed from several parts joined together by a braze-welding process according to the invention.

The braze-welding process of the invention may also be used to join together parts serving for the manufacture of other structures, such as glasshouse frames or the like, ventilation ducts, electrical cabinets, etc.

EXAMPLES

To demonstrate the feasibility and effectiveness of the gas mixture according to the invention when it is used in braze-welding, comparative trials were carried out under the following conditions.

The assemblies to be welded were formed from DX54D+ Z120 sheets 0.8 mm and 1.5 mm in thickness according to the EN10142 standard and hot-dip galvanized on both sides, that is to say having two zinc faces 10 μm in thickness.

The assemblies were positioned flat in a lap configuration. $CuAl_8$-type and $CuSi_3$-type filler wires 1 mm and 1.2 mm in diameter were used depending on the two types—short-arc and pulsed—of transfer.

The influence of the nature of the shielding gas was evaluated using pure argon as control.

In the tests, the following evaluation criteria were used:

no spatter, no open porosity (verification of closed porosity by radiography);

good wetting: flat bead, little penetration, join angle;

no metallurgical defects: cracking, grain coarsening;

little degradation of the zinc coating; and bead appearance: few deposits of adherent oxides.

For the purpose of expelling the zinc vapor upstream of the weld pool and preventing them from entering the gaseous atmosphere shielding the electric arc, it is preferable in the MIG process to weld in the pushing direction with a torch inclination of about 25°. Below this angle, zinc vapor extraction is not as effective, which is manifested by arc instability and spatter. Above this angle of 25°, perturbations occur when the molten metal is expelled by the gas jet. Moreover, the gas jet with a horizontal orientation runs the risk of bringing in ambient air behind the arc, which degrades the shielding of the weld pool.

The ideal gas flow for shielding the arc and the weld pool is given by a value normalized to the area of about 0.05 l/min×mm². Thus, for a nozzle 20 mm in diameter, in automatic welding, the flow rate is 30 l/min, whereas for a nozzle 16 mm in diameter, in manual welding, the flow rate is 20 l/min.

Example 1

Choice of Gas Mixture

Firstly, the inventors of the present invention have sought to determine the effects of several gaseous compounds contained in an argon-based shielding gas mixture.

The components of the mixture that were tested and the results obtained are given in Table I below.

TABLE I

| Gas | Arc stability | Compactness/ Porosity | Wetting | Other Oxidation risks |
|---|---|---|---|---|
| Argon | + | 0 | 0 | + |
| $CO_2$ | +++ | + | − | − |

TABLE I-continued

| Gas | Arc stability | Compactness/ Porosity | Wetting | Oxidation | Other risks |
|---|---|---|---|---|---|
| $O_2$ | +++ | − | + | −− | Root porosity |
| $H_2$ | ++ | − | ++ | −− | |
| He | 0 | + | ++ | + | Flared arc |
| $N_2$ | + | 0 | 0 | + | |

In Table I:
"+++" means excellent;
"++" means very good;
"+" means good;
"0" means moderate;
"−" means poor; and
"−−" means very poor.

As regards arc stability, Table I shows that, when oxidizing components, such as $O_2$ and $CO_2$, are added to the argon the arc stability is increased through the formation of surface oxides that are more emissive. Nitrogen may also bring about a stabilizing effect, but to a lesser extent.

Certain components, such as He or $H_2$, in argon have a positive contribution to the appearance and morphology of the bead.

In helium, the arc requires a higher voltage and therefore a large amount of energy injected into the weld pool, which may improve the bead-wetting conditions but penetration control is made more difficult on thin sheet.

Hydrogen helps to improve the morphology and the appearance of the bead.

The first property is due to an arc constriction effect in the zone close to the end of the wire, that is to say an endothermic dissociation that causes substantial cooling of the external periphery, and therefore the constriction, and a substantial heat recovery effect at the workpiece to be welded, namely a recombination on the surface with the release of energy.

The second property, through the reducing effect of hydrogen, allows beads to be obtained that are free of surface oxides.

Example 2

Testing of the 98.5% Ar/1% $H_2$/0.5% $CO_2$ Gas Mixture

In this example, the gas mixture mixture formed from 98.5 vol % Ar+1 vol % $H_2$+0.5 vol % $CO_2$ was assessed in automatic welding and in manual welding, using the following parameters:

In automatic welding:
  nozzle-workpiece distance (d): 15 mm
  gas flow rate (Q): 30 l/min
  welding speed (Vw): 50 cm/min
  torch angle to the vertical: 25°
In manual welding:
  nozzle-workpiece distance (d): 12 mm
  gas flow rate (Q): 20 l/min
  welding speed (Vw): 40 cm/min
  torch angle to the vertical: 25°

The other parameters adopted (type of filler wire, transfer mode, etc.) are given in Table II below for the 98.5% Ar/1% $H_2$/0.5% $CO_2$ mixture.

TABLE II

| | | $V_{wire}$ [m/min] | $U_{mean}$ [V] | $I_{mean}$ [A] | $V_w$ [cm/min] | $P_{mean}$ [kW] | $E_{lin}$ [J/mm] |
|---|---|---|---|---|---|---|---|
| Pulsed | $CuAl_8$ | | | | | | |
| transfer (1) | 0.8 mm | 4 | 19 (17.6) | 72 | 75 | 1.37 | 110 |
| | 1.5 mm | 5 | 19.4 (17.6) | 95 | 50 | 1.94 | 233 |
| | $CuSi_3$ | | | | | | |
| | 0.8 mm | 2.7 | 19 | 44 | 50 | 0.84 | 101 |
| | 1.5 mm | 5 | 20.2 | 86 | 50 | 1.74 | 209 |

| | | $V_{wire}$ [m/min] | $U_{mean}$ [V] | $I_{mean}$ [A] | $V_w$ (3) [cm/min] | $P_{mean}$ [kW] | $E_{lin}$ (3) [J/mm] |
|---|---|---|---|---|---|---|---|
| Short- | $CuAl_8$ | | | | | | |
| arc transfer (2) | 0.8 mm | 3.6 | 15.6 | 87 | ≈70 | 1.36 | 116 |
| | 1.5 mm | 4.6 | 16.3 | 106 | ≈70 | 1.73 | 148 |
| | $CuSi_3$ | | | | | | |
| | 0.8 mm | 3.7 | 14.9 | 79 | ≈70 | 1.18 | 101 |
| | 1.5 mm | 5.5 | 15.2 | 106 | ≈70 | 1.61 | 138 |

(1) Tests carried out in automatic welding with a 480TR16 current generator sold by La Soudure Autogène Francaise;
(2) Tests carried out in manual welding with a TPS2700 current generator sold by Fronius;
(3) Estimated manual welding speed as an indicator.

In the $U_{mean}$ column, the numbers in brackets correspond to the voltage in the case of pure argon.

The results obtained are compared as regards the metallurgical appearance and the operating conditions, namely ease of implementation, melting of the wire, arc stability and amount of spatter.

FIG. 1 makes it possible to compare arc stability in pulsed welding with argon (top graph) with, for comparison, the Ar/$H_2$/$CO_2$ gas mixture of the invention (bottom graph). As may be seen, in pulsed welding the improvement in arc stability is manifested by less dispersion in the peak voltage (U) and, at low voltages, in the drop detachment voltage.

In short-arc welding, it is essentially the uniformity of the short-arc frequency, the arc time/short-arc time ratio and the short-arc current that are appreciated.

Wetting is of particular interest in braze-welding.

Figure 2:
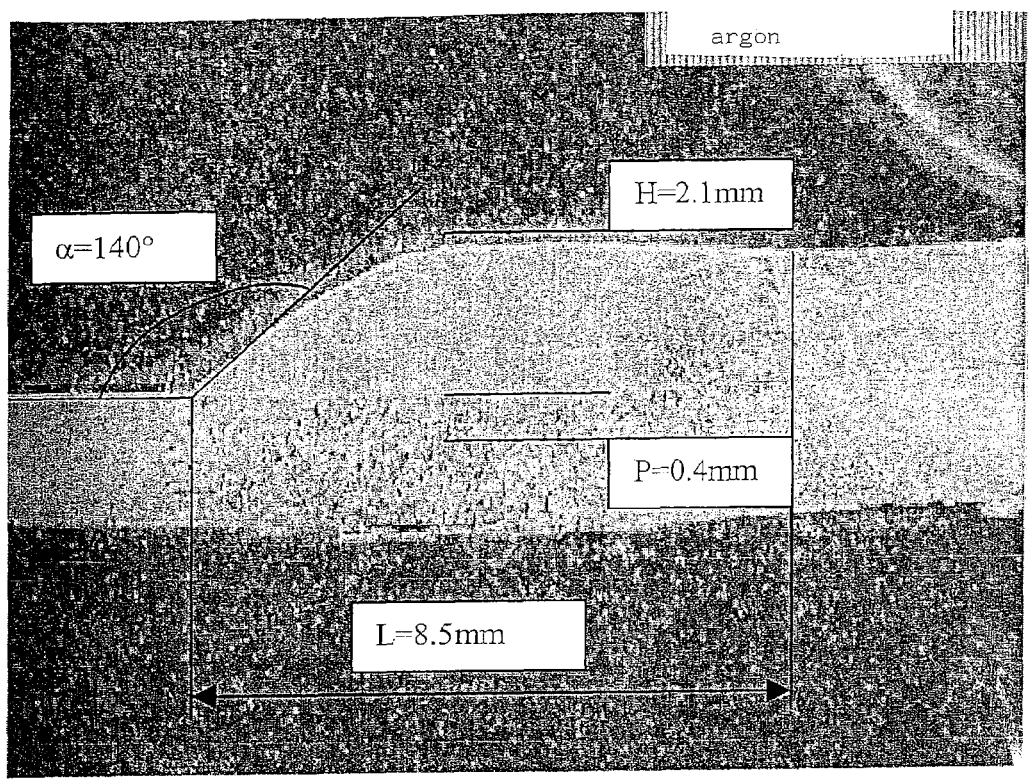
Figure 2:
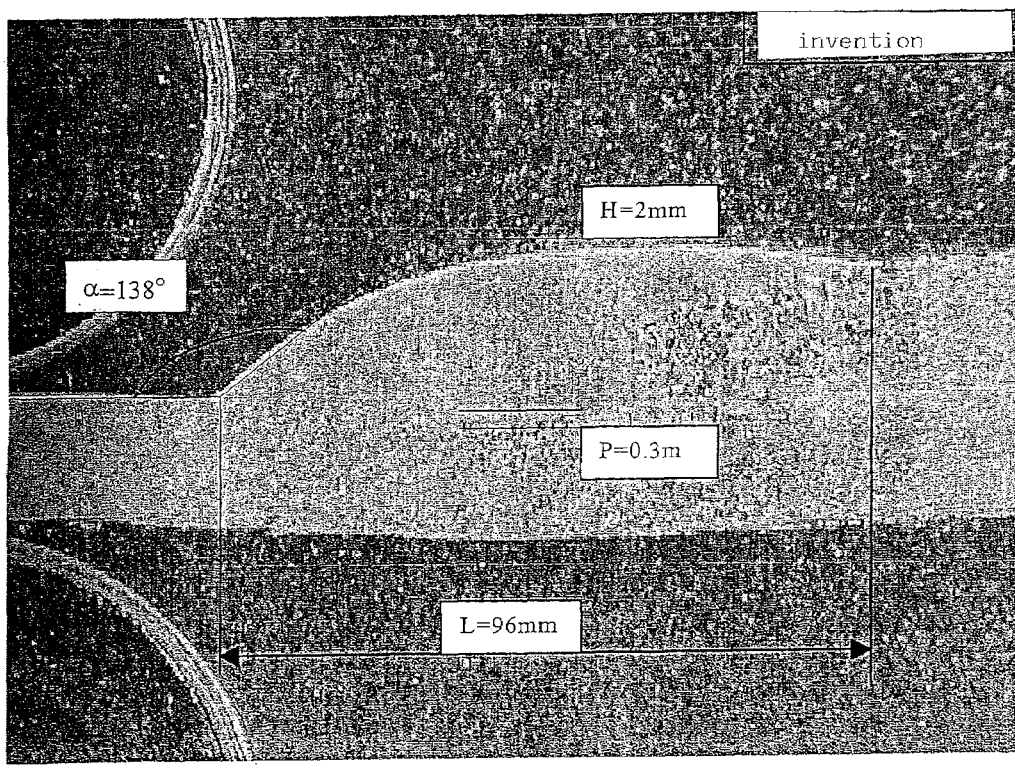

FIG. 2 makes it possible to compare the wetting obtained in pulsed welding with argon (top graph) with, for comparison, the Ar/$H_2$/$CO_2$ gas mixture of the invention (bottom graph).

In the macrographic sections in FIG. 2, the wetting is characterized by the width (L), the thickness (H), the penetration (P) and the join angle (a). An example of this evaluation is appended (FIG. 2).

The mechanical performance of the joints obtained with sheet 0.8 mm in thickness is assessed by the tensile strength ($R_m$) measured in a "guided" tensile test.

The results are given in Table III below for the ternary Ar/$CO_2$/$O_2$ gas mixture of the invention (composition: 98.5% Ar; 1% $H_2$; 0.5% $CO_2$) and, for comparison, a binary gas mixture consisting of argon to which 2 vol% of $CO_2$ has been added (i.e. Ar/2% $CO_2$).

TABLE III

| | Wire/gas | Max. $V_w$ [m/min] | Spatter | Appearance | Wetting | Oxides | Heat/ Deformation | $R_m$ (3) [MPa] |
|---|---|---|---|---|---|---|---|---|
| Pulsed | $CuAl_8$ | | | | | | | |
| transfer (1) | mixture | | +++ | + | + | + | + | 304.4 |
| | Argon | | + | + | 0 | 0 | + | 296.8 |
| | $Ar/H_2/N_2$ | | ++ | – | 0 | 0 | – | 303.0 |
| | $CuSi_3$ | | | | | | | |
| | Mixture | | +++ | + | + | + | + | 272.3 |
| | $Ar + 2\% CO_2$ | | ++ | 0 | 0 | 0 | + | 275.4 |
| | $Ar/CO_2/O_2$ | | 0 | 0 | 0 | – | – – | 271.4 |
| Short-arc | $CuAl_8$ | | | | | | | |
| transfer (2) | Gas mixture | | + | ++ | ++ | ++ | +++ | – |
| | Argon | | 0 | + | + | + | ++ | – |
| | $CuSi_3$ | | | | | | | |
| | $Ar + 2\% CO_2$ | | 0 | 0 | 0 | 0 | ++ | – |
| | Mixture | | + | ++ | ++ | 0 | +++ | – |

(1) and (2): see legend beneath Table II;
(3) Systematic fracture in the base metal;
Assessment rating: see legend under Table II.

As may be seen, the ternary gas mixture of the invention (98.5% Ar+1% $H_2$+0.5% $CO_2$) results, by comparison, in very good results compared with the binary control mixture.

Additional tests carried out in some have shown that, in the range from 0.3 to 2 vol % $CO_2$, a satisfactory arc stabilization effect is obtained for a $CO_2$ content of about 0.5%. However, it is not desirable to increase this $CO_2$ content as it results in negative effects as regards oxidation of the welded joint, especially oxide deposits and smoke.

Likewise, in the range from 0.5 to 10% $H_2$, the upper limit is determined by the maximum solubility of hydrogen in the molten metal, which is manifested by the risk of porosity appearing as soon as the upper limit is exceeded. By means of a multilayer deposit, which simulates rework, local distribution or consolidation, it has been shown that this risk does not exist in the case of a hydrogen concentration of less than about 2%. For safety, the $H_2$ content has been limited to 1 vol %, which also represents a good compromise between improving the shape and appearance of the bead, and the increase in welding speed. Total hydrogen assays in the deposited metal have revealed a content of 6 µ/g, which corresponds to 0.067 g/cm$^3$, knowing that the maximum solubility value acceptable from the industrial standpoint is 0.100 g/cm$^3$ in the case of a copper aluminum alloy.

One specific criterion in the automobile industry is the capability of the process to absorb gaps between the sheets, that is to say assembly tolerance. For thin workpieces (thickness <1.5 mm), the gap may be equal to the thickness.

Particularly advantageously, the joints welded with the ternary gas mixture of the invention have tolerated a gap ranging up to 2 mm in the case of a 1.5 mm thickness, i.e. a gap greater than the thickness of the welded parts.

By way of comparison, the use of gas mixtures based on argon to which a few percent of oxygen or nitrogen has been added results in greater energy being injected into the weld pool and rapidly entails a risk of undesirable puncture of the top sheet of the assembly.

Furthermore, when braze-welding, it is desirable to create a joint with minimal dilution of the base metal, typically iron. However, slight fusion of this base metal is tolerated so as to prevent simple bonding of the bead.

During the tests carried out within the context of the present invention, it was observed that the degree of dilution of the iron in the deposited metal, calculated according to volume contributions, remains below 5% in the case of sheet 1.5 mm in thickness, which is a value that is quite acceptable from the industrial standpoint.

The gas mixture of the invention has furthermore shown an ability to achieve good workability in manual welding since vertical downhand welding and horizontal-vertical welding do not require particular parameters to be adapted compared with flat-position welding.

It should be noted that the surface appearance of the bead may be further improved using a "drag rod" that extends the shielding zone by about 50 mm in order to optimize the gaseous shielding of the weld pool during cooling, as this makes it possible to eliminate the copper oxides formed on the bead, a phenomenon taking place essentially with the $CuSi_3$ filler metal.

If the annular nozzle is fed with the ternary shielding gas mixture of the invention, the "drag rod" may preferably be fed with the same gas mixture or with pure argon (flow rate: about 10 l/min).

The invention claimed is:

1. A method for braze-welding galvanized metal parts comprising producing a brazed joint between said parts to be joined together, wherein said joint is produced with a brazing means, wherein said means comprises:
    a) at least one electric arc;
    b) at least one copper aluminum alloy filler wire; and
    c) a gas mixture, wherein said gas mixture consists essentially of:
        1) about 0.4% to about 2% hydrogen by volume;
        2) about 0.3% to about 2% carbon dioxide by volume; and
        3) about 96% to about 99.3% argon.

2. The method of claim 1, wherein said gas mixture comprises less than about 1.95% hydrogen.

3. The method of claim 2, wherein said gas mixture comprises less than about 1.5% hydrogen.

4. The method of claim 3, wherein said gas mixture comprises less than about 1.3% hydrogen.

5. The method of claim 1, wherein said gas mixture comprises at least about 0.5% hydrogen.

6. The method of claim 5, wherein said gas mixture comprises at least about 0.7% hydrogen.

7. The method of claim 1, wherein said gas mixture comprises less than about 1% carbon dioxide.

8. The method of claim 7, wherein said gas mixture comprises less than about 0.8% carbon dioxide.

9. The method of claim 1, wherein said gas mixture comprises at least about 0.35% carbon dioxide.

10. The method of claim 9, wherein said gas mixture comprises at least about 0.4% carbon dioxide.

11. The method of claim 1, wherein said gas mixture consists essentially of:
   a) about 0.8% to about 1.1% hydrogen;
   b) about 0.4% to about 0.7% carbon dioxide; and
   c) about 98.2% to about 98.8% argon.

12. The method of claim 1, wherein said gas mixture consists essentially of:
   a) about 1% hydrogen;
   b) about 0.5% carbon dioxide; and
   c) about 98.5% argon.

13. The method of claim 1, wherein said parts to be joined have a thickness of less than about 3 mm.

14. The method of claim 13, wherein said parts to be joined have a thickness of about 0.5 mm to about 2 mm.

15. The method of claim 1, wherein said parts to be joined together are motor vehicle elements comprising at least one member selected from the group consisting of:
   a) vehicle bodies;
   b) floor/hinge-knuckle joints;
   c) engine cradles;
   d) dashboard cross-members;
   e) longitudinal members;
   f) cross-members under seats; and
   g) hydroformed components.

16. The method of claim 1, wherein said parts to be joined together further comprise parts made of non-alloy carbon steel.

* * * * *